Figure 1:
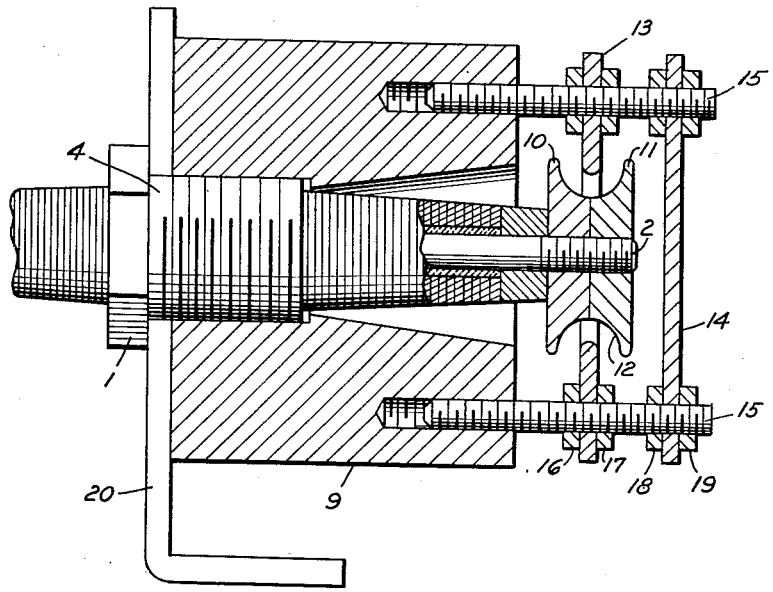

April 22, 1952     C. B. PROUDFOOT     2,594,212
ION GAUGE MOUNTING
Filed March 25, 1947     2 SHEETS—SHEET 1

INVENTOR.
Charles B. Proudfoot

April 22, 1952

C. B. PROUDFOOT 2,594,212

ION GAUGE MOUNTING

Filed March 25, 1947

2 SHEETS—SHEET 2

INVENTOR.
Charles B. Proudfoot
BY

Patented Apr. 22, 1952

2,594,212

UNITED STATES PATENT OFFICE 2,594,212

ION GAUGE MOUNTING

Charles B. Proudfoot, Niagara Falls, N. Y., assignor to the United States of America as represented by the United States Atomic Energy Commission Application March 25, 1947, Serial No. 737,173

10 Claims. (Cl. 250—83.6)

My invention relates to ion gauge mountings or supports, and more particularly to a support for mounting the parts of a cold cathode ion gauge, preferably of the race type.

In the art of electromagnetically operated equipment for the separation of isotopes or substances, it is necessary to operate the equipment at low pressures, and pumping down or "baking" operations are employed to reduce the pressure. During this period, and later during the operation of the system, it is necessary to secure information regarding the pressure within the system and to maintain close control over the pumps in order to provide optimum operating conditions within the system.

Ion gauges are often used for this purpose since the ionization produced in the system is a function of pressure. The conventional hot cathode ion gauge, however, has a number of disadvantages, one of which is the fact that the heater element or filament burns out. Cold cathode ion gauges of the Phillip's type have also been employed for this purpose. However, they are not well suited for pressure measurements at high pressures, and have not been successfully utilized for making pressure readings in the system during the evacuating or "baking" stages of the operations. On the other hand, a modification of the Phillip's ion gauge, called the race gauge, described in the copending application of Arnold Ser. No. 746,954, now Patent #2,577,066, has been developed and is adapted for operation at the higher as well as the lower pressures. It is particularly useful in providing pressure readings for the "baking" stages of the operations, but one of the principal limitations on the use of that gauge has been that no proper or adequate mounting has existed for setting it up in the tanks or other equipment of the system where the pressure is to be ascertained. Mountings heretofore suggested fail to adequately insulate the parts, to insure a strong sturdy structure capable of withstanding the rough treatment to which production equipment is subjected, and to provide a structure which may be quickly and easily broken down and then reassembled for facilitating the cleaning and repair of the ion gauge. Another limitation on the development of a proper mounting is that certain combinations of parts and certain shapes introduce extraneous oscillating regions which effect the operation or accuracy of the gauge.

Applicant with a knowledge of all of these defects in and objections to the prior art has for an object of his invention the provision of a mounting for an ion gauge wherein extraneous oscillating regions are avoided.

Applicant has as another object of his invention the provision of a mounting for an ion gauge wherein what is commonly known as the spark plug is protected from sputtered material by the body and the baffling action of the cathode.

Applicant has as another object of his invention the provision of a mounting for an ion gauge having a grounded shield for eliminating the effects of long sparks to other parts of the system.

Applicant has as a still further object of his invention the provision of a mounting for an ion gauge which is compact and easy to build and which can be easily disassembled and the parts cleaned, repaired or replaced.

Other objects and advantages of my invention will appear from the following specification and the accompanying drawings, and the novel features thereof will be particularly pointed out in the annexed claims.

Figure 2:
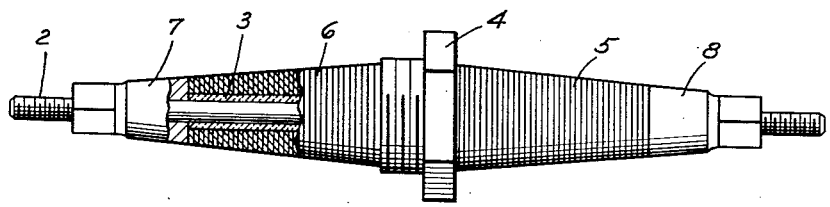
Figure 3:
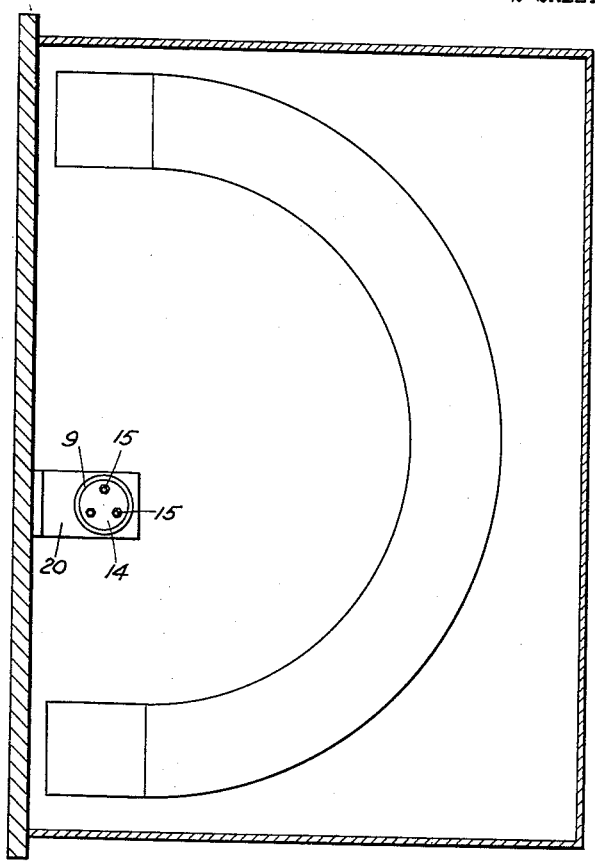
Figure 4:
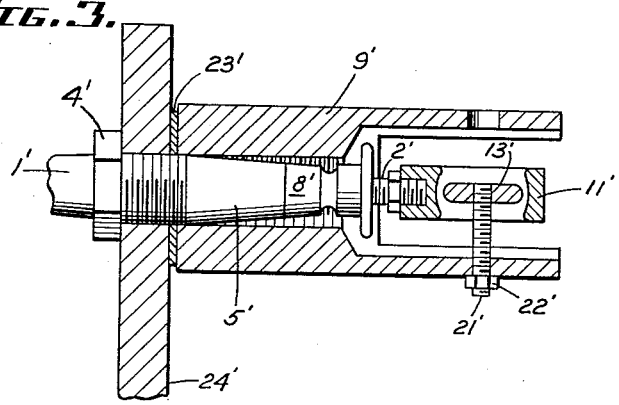

In the drawings, Fig. 1 is a detail, partly in section, of a race type ion gauge mounted on my improved mounting. Fig. 2 is a detail of a spark plug used in my improved mounting. Fig. 3 is a sectional elevation of a tank with my improved ion gauge mounting disposed therein. Fig. 4 is a modification of my improved ion gauge mounting.

Referring to the drawings in detail, I designates a support, but it is generally referred to in this particular art as a spark plug. However, this type of spark plug differs in many respects from the conventional and well known spark plug used in connection with automobiles and other engines. It derives its name largely from its similarity in appearance with the well known types of plugs, although in function it acts as an insulating bushing support. A stem or shaft 2 thereof has a roll of pressed mica 3 about it to provide a tube of insulation. Mounted on the tube of insulating material is a gland nut or casing 4 which is externally screw threaded, and pressed to substantially solid form are a series of mica washers 5, 6 held in place on either side of gland nut 4 by metal collars or retainers 7, 8. The metal retainers 7, 8 may be either sweated or pressed on stem or shaft 2 or they may be screw threaded thereon, as preferred.

The spark plug 1 serves as the means of support for the assembly described more in detail hereinafter, and also provides an electrical connection to one electrode. A hollow cylinder 9 has a tapered bore which merges into an internally screw threaded bore adjacent one end, and is adapted to receive and coact with the outer screw threaded surface of the gland nut or casing 4 of the spark plug 1. It is held in place on the spark plug by screw threaded engagement with the casing or gland nut 4 which serves to mount it. The cylinder 9 acts both as a grounded shield and as a base upon which are mounted other parts of the assembly. A spool or race shaped cathode is split into two halves 10, 11 and is threaded onto the screw threaded shank 2 of the spark plug 1. When the two halves 10, 11 of the spool are threaded on shank 2 and mounted in abutting relation they provide a peripheral groove 12 of arcuate configuration. The anode 13 is a circular plate or disc having a central opening therethrough which is substantially larger than the walls defining the bottom of the peripheral groove 12, but is smaller than the walls defining the outer edges of the spool. A circular plate 14 is used as a grounded shield near the electrodes 10, 11, and 13 to prevent sparking in the direction of the magnetic field, this direction being parallel to the center line or the longitudinal axis.

Three threaded studs 15, 15, 15 carried by threaded bores in cylinder 9 extend axially from the cylinder. The studs 15, 15, 15 pass through openings in anode 13 which is held in place centrally of the groove in split cathode 10, 11 by nuts 16, 17, which, however, permit adjustment of the anode 13 with respect to cathode 10, 11 by screwing such nuts onto or off of the studs 15, 15, 15. Shield 14 is likewise mounted on studs 15, 15, 15 by nuts 18, 19 which screw thereon and which abut against either surface of plate 14. They serve to adjust the plate towards and away from the electrodes by movement of nuts 18, 19.

Since for proper operation it is necessary to have the magnetic field parallel with the axis of the electrodes, it was decided to mount this structure on a right angle bracket. This can be done by forming an opening in the bracket 20 and passing it over spark plug 1, clamping it in place between the shoulder of the gland nut 4 and the outer wall of cylinder 9. The other leg of the bracket may then be mounted by screws or other means on the face plate of the tank or other chamber under evacuation so that the axis of the spark plug is parallel with the magnetic field and the electrodes are disposed within it, as shown in Fig. 3.

In order to obviate the necessity for using a right angle bracket, a modified form of mounting has been developed. This is shown in Fig. 4 wherein 1' designates the spark plug generally, 2' designates the shank of the plug and 3' designates a collar or retainer for the insulating washers 5'. A cylinder 9' having bifurcated ends is screw threaded onto the gland nut or casing 4' with washer 23' interposed between the wall of the tank 24' and the cylinder 9'. Mounted on the screw threaded end of shank 2' is a ring shaped cathode 11' having an arcuate shaped bore therein. Disposed within the bore is a disc 13' which serves as an anode and which is mounted from the lower bifurcation of cylinder 9' by a stud 21' which screw threads into bores in the disc 13' and the lower bifurcation of cylinder 9' and is locked in place by nut 22'. It will be seen that the axes of the electrodes lie in the plane of the lines of the magnetic field and that this arrangement requires no right angle bracket for mounting it on the tank.

Having thus described my invention, I claim:

1. A mounting for an ion gauge of the character described comprising, a plug including an inner stem and an outer shell in spaced relation, a cylinder carried by the outer shell, elements for mounting one electrode of the ion gauge on the cylinder and the other electrode on the stem, and means including a shoulder on said plug for mounting the plug on a pressure chamber to dispose the gauge therein.

2. An ion gauge mounting of the character described comprising an insulating bushing mounting including an outer casting and an inner stem, insulation interposed between the casing and the stem, said casing having a shoulder, a tubular member carried by the casing, elements for mounting one electrode of an ion gauge on the stem and a plurality of spaced supports bridging the tubular member and the other electrode for supporting it thereon, and means for mounting the plug on the wall of a pressure chamber to dispose the ion gauge therein, said means including a bracket interposed between said shoulder and said tubular member.

3. An ion gauge mounting of the character described comprising a plug including an outer casing and an inner stem, insulation interposed between the casing and the stem, a cylinder disposed about the casing and secured thereto, mechanism for threadedly mounting one electrode of an ion gauge on the stem and the other on the cylinder, and means for mounting the plug on the wall of a pressure chamber to dispose the ion gauge therein, said means including a shoulder on said casing for co-action with the cylinder to engage a supporting wall.

4. An ion gauge mounting of the character described comprising a plug including an outer casing and an inner stem, said casing having an annular shoulder insulation interposed between the casing and the stem, an elongated tubular member carried by the casing, structures for mounting one electrode of an ion gauge on the stem and the other electrode on the tubular member, and means for mounting the plug on the wall of a pressure chamber, said means including a threaded portion on said casing for co-action with the tubular member to clamp the wall between the shoulder and said tubular member.

5. An ion gauge mounting of the character described comprising a plug including an outer casing and an inner stem, insulation interposed between the casing and the stem, a tubular member mounted on the casing, an arrangement for mounting one electrode of an ion gauge on the shaft and the other electrode on the tubular member, studs carried by the tubular member for mounting a shield for said electrodes, and means for mounting the plug on a wall by a pressure chamber to dispose an ion gauge therein.

6. An ion gauge mounting of the character described comprising an insulating bushing support including an inner stem and an outer casing, a split inner electrode of spool configuration carried by said stem and the outer electrode of an ion gauge being carried by said casing, and means for mounting the plug on the wall of a pressure chamber.

7. An ion gauge mounting of the character described comprising a plug including an outer casing and an inner stem, insulation interposed between the stem and the casing, a tubular member disposed about the casing and secured thereto, the inner split electrode of an ion gauge being mounted on the stem, and studs carried by the tubular member for mounting the outer electrode of the gauge in spaced relation to the inner electrode.

8. An ion gauge mounting of the character described comprising a plug including an inner stem and an outer casing in spaced relation, an elongated tubular member having a tapered bore merging into a screw threaded bore, said tubular member being disposed about the casing and in screw threaded engagement therewith, means for mounting the inner electrode of an ion gauge on the stem and the outer electrode on the tubular member, and a bracket for mounting the plug on the wall of a pressure chamber.

9. An ion gauge mounting of the character described comprising a plug including an inner stem and an outer casing, insulation interposed between them, an elongated tubular member disposed about a portion of the casing and secured thereto, an ion gauge having one electrode mounted on said stem and the other electrode on the outer casing, and a bracket interposed between the tubular member and casing for mounting the plug within a pressure chamber.

10. An ion gauge mounting of the character described comprising a plug including an inner stem and an outer casing, insulation interposed between them, an elongated tubular member disposed about the casing and secured thereto, said tubular member having bifurcations extending longitudinally therefrom, an arrangement for mounting one electrode of the ion gauge on said stem and the other electrode on one of said bifurcations, and additional means for mounting the plug on the wall of a pressure chamber.

CHARLES B. PROUDFOOT.

REFERENCES CITED

The following references are of record in the file of this patent:

UNITED STATES PATENTS

| Number | Name | Date |
|---|---|---|
| 2,127,512 | Harper | Aug. 23, 1938 |